United States Patent
Sa et al.

(10) Patent No.: US 10,685,377 B2
(45) Date of Patent: Jun. 16, 2020

(54) PROMOTION CONFIGURATION AND FACILITATION WITHIN A NETWORK SERVICE

(71) Applicant: Facebook, Inc., Menlo Park, CA (US)

(72) Inventors: Brian Pai-Han Sa, Mountain View, CA (US); Xun Wilson Huang, Alameda, CA (US); Nikola Vilimonovic, San Francisco, CA (US); Ishtiaq Hossain, Sunnyvale, CA (US); Mehedi Bakht, Menlo Park, CA (US); Snorri Gylfason, Palo Alto, CA (US); Adithya Venkata Surampudi, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 494 days.

(21) Appl. No.: 14/572,056

(22) Filed: Dec. 16, 2014

(65) Prior Publication Data
US 2016/0171530 A1   Jun. 16, 2016

(51) Int. Cl.
| | | |
|---|---|---|
| G06Q 30/02 | (2012.01) | |
| G06Q 50/00 | (2012.01) | |
| G06F 3/0482 | (2013.01) | |
| G06F 8/38 | (2018.01) | |
| G06F 8/34 | (2018.01) | |

(52) U.S. Cl.
CPC ....... *G06Q 30/0251* (2013.01); *G06F 3/0482* (2013.01); *G06F 8/34* (2013.01); *G06F 8/38* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0276401 A1* | 11/2011 | Knowles | ................ | G06Q 30/02 705/14.58 |
| 2012/0084160 A1* | 4/2012 | Badros | ............... | G06Q 30/0241 705/14.73 |
| 2014/0074601 A1* | 3/2014 | Delug | .................... | G06Q 30/02 705/14.53 |
| 2014/0351012 A1* | 11/2014 | Jernigan | ............ | G06Q 30/0202 705/7.31 |

* cited by examiner

*Primary Examiner* — William A Brandenburg
(74) *Attorney, Agent, or Firm* — Keller Jolley Preece

(57) ABSTRACT

Exemplary methods, apparatuses, and systems generate a graphical user interface (GUI) including a plurality of selectable elements. Selections of an application and a first filter within the GUI configure the promotion to be displayed to a subset of a selected group of users, the subset being users that access the network service using a user device that both runs the selected application and meets user device state criteria defined by the selected first filter. A request corresponding to the first filter is transmitted to a user device detected to be running the selected application and associated with the selected group of users. When the user device is determined to satisfy the user device state criteria, the promotion is transmitted to the user device.

20 Claims, 10 Drawing Sheets

New Promotion

Template > Content > Basic Info

Filter(s) ▶

- 455 — App version <= | Version# ▶ |
- 460 — App version >= | Version# ▶ |
- 465 — Does not have app installed | App ▶ |
- 470 — Has app installed | App ▶ |
- 475 — Minimum storage available | 1 MB ▶ |
- 480 — Minimum battery level | 20% ▶ |
- 485 — Day of the week | ☐ Su ☑ Mo ☑ Tu ☑ We ☑ Th ☑ Fr ☐ Sa |
- 490 — Time in session | 5 mins ▶ |
- 495 — On Wifi | ☑ Yes ☐ No |

Back — 420

Next — 325

PROMOTION CONFIGURATION AND FACILITATION WITHIN A NETWORK SERVICE

FIELD

The various embodiments described herein relate to creating and running a promotion within a network service. In particular, the embodiments relate to providing a graphical user interface to configure a promotion, utilizing user device state criteria as a defined in the configuration to determine which users will be presented with the promotion, and presenting the promotion to those users.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Additionally, the social network may present promotions to users, e.g., to add an application to their device, to advertise a product, etc. Similar interactions may also be a part of the user experience within other network services.

SUMMARY OF THE DESCRIPTION

Exemplary methods, apparatuses, and systems generate a graphical user interface (GUI) including a plurality of selectable elements. The selectable elements define configuration parameters of a promotion to be displayed to one or more users in a selected group of users of a network service, such as a social network. In one embodiment, the selectable elements include a plurality of applications and a plurality of filters. For example, the plurality of applications may include different implementations of a single application across varying platforms. The plurality of filters may include server-side filters and client-side filters. Additionally, the selectable elements may include promotion templates, button functionality, promotion triggers, social context, static content, dynamically resolved content, the promotion audience, promotion start/stop dates, promotion duration, an impression limit, etc.

Embodiments receive selection of an application and a first filter within the GUI. The selections of the application and of the first filter configure the promotion to be displayed to a subset of the selected group/audience of users. The subset of the selected group of users includes users that access the network service using a user device that both runs the selected application and meets user device state criteria defined by the selected first filter. For example, a promotion start time may cause embodiments to monitor for and detect a user device that is running the selected application and is associated with the selected group of users. Once detected, embodiments transmit a request corresponding to the first filter to the detected user device. In one embodiment, transmitting the request includes requesting the user device to provide device state data. In another embodiment, transmitting the request includes requesting the user device to evaluate whether or not the user device satisfies user device state criteria defined by the first filter. Embodiments receive from the user device the client state data or resolution of the first filter. Embodiments further determine if the user device satisfies the user device state criteria defined by the first filter based upon the received response from the user device. If the user device satisfies the user device state criteria defined by the first filter, embodiments transmit the promotion to the user device.

For example, if the first filter defines a minimum threshold of battery power, embodiments may request and receive the current battery level of the user device. Embodiments compare the received battery level against the threshold. If the current battery level is above the threshold, embodiments transmit the promotion. If the current battery level is not above the threshold, embodiments do not transmit the promotion. Similarly, trigger events, other client-side filters, server-side filters, and other configuration parameters may be utilized to determine whether or not to transmit the promotion to the user device.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein enable the configuration of promotions through a graphical user interface and facilitate the configured promotions. In particular, embodiments utilize the graphical user interface to enable the configuration the layout, content, and targeting of the promotion based upon client application/platform, server-side filters, client-side filters, promotion templates, button functionality, promotion triggers, social context, static content, dynamically-resolved content, the promotion audience, promotion start/stop dates, promotion duration, an impression limit, etc. As a result, promotions for products, features, and advertisements are easily established and distributed to a targeted audience. Additionally, while embodiments are described with reference to promotions, embodiments may also be applied to the creation, configuration, and distribution of alerts and other messages.

In the following description, numerous specific details are set forth. However, it is understood that embodiments of the invention may be practiced without these specific details. While a social networking system is used to describe embodiments of promotion configuration and facilitation, it will be understood that these concepts are generally applicable to other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
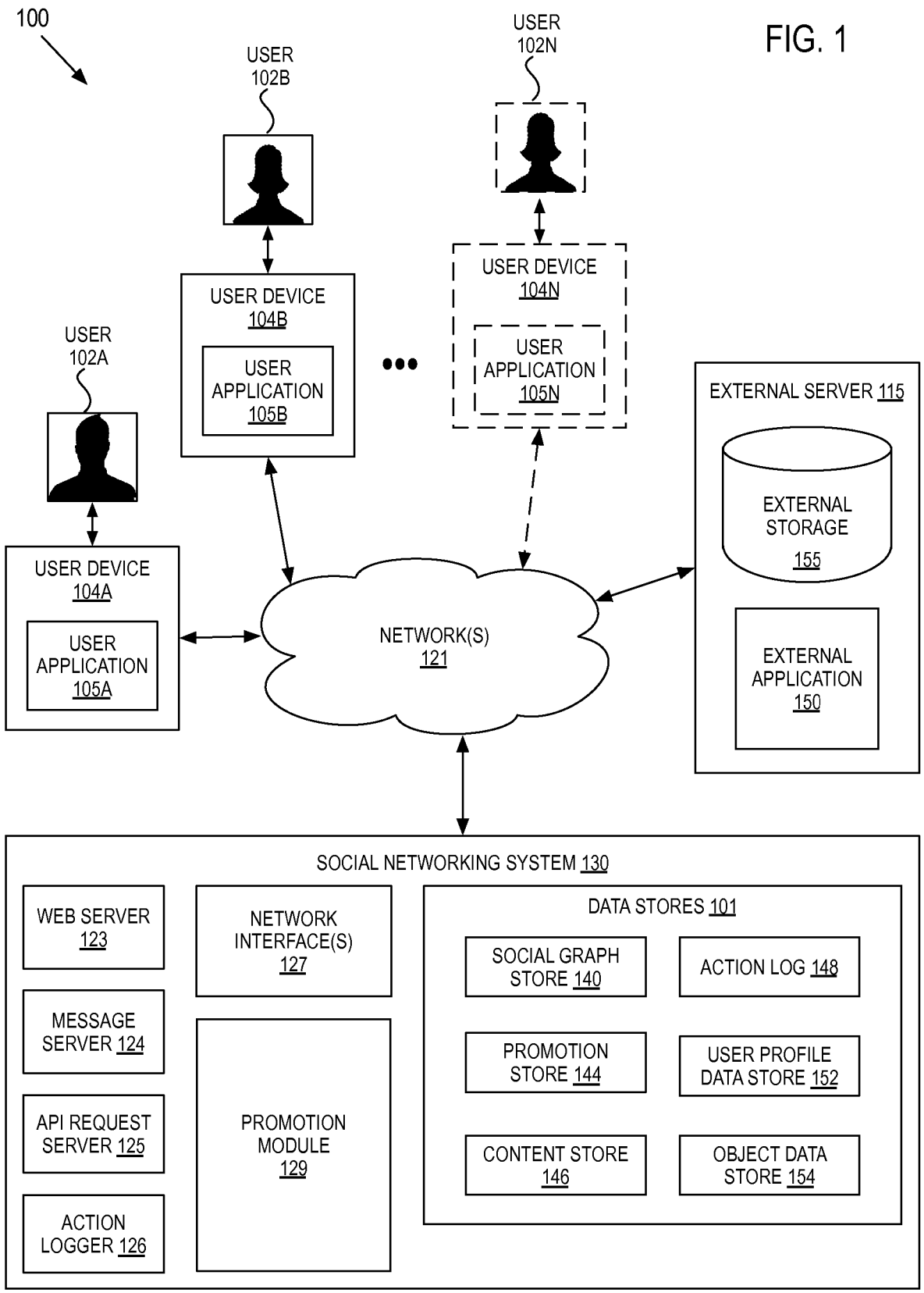
FIG. 1 illustrates an exemplary network environment of a social networking system to create and run a promotion.

FIG. 1 illustrates an exemplary network environment of a system 100, including a social networking system 130, to create and run a promotion. Social networking system 130 offers its users 102A-102N the ability to communicate and interact with other users 102A-102N and entities of the social networking system 130 according to an embodiment of the invention. The user devices 104A-104N are enabled to interact with social networking system 130 and can be any type of computing device capable of receiving user input as well as transmitting and/or receiving data via a network (e.g., network 121). Exemplary user devices 104A-104N include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices programmed to implement one or more embodiments set forth herein.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native platform or operating system of the user device 104A, such as Windows®, Mac OSX®, iOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In some embodiments, the social networking system 130 comprises one or more computing devices storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a movie, food, etc.

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and a promotion store 144, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a "post." In some embodiments, a user can send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, creating a post or otherwise sending a message to another user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, social networking system 130 includes a promotion module 129 for creating and facilitating promotions in accordance with an embodiment of the invention. In an alternate embodiment, the promotion module 129 is a part of the external server 115. For example, the promotion module 129 may be implemented by the external application 150. In one embodiment, promotion module 129 generates a GUI including a plurality of selectable elements for the configuration of a promotion. Selections of elements, such as an application and a first filter, within the GUI configure the promotion to be displayed to a subset of a selected group of users. The configuration of a promotion via a GUI is described herein with reference to FIGS. 3-6.

In one embodiment, promotion module 129 further implements the distribution of the promotion as configured. For example, a request corresponding to the selected filter is transmitted to a user device detected to be running the selected application and associated with the selected group of users. A response corresponding to the selected filter is received from the user device. When the user device is determined to satisfy user device state criteria defined by the selected filter, the promotion is transmitted to the user device. The facilitation of promotion distribution is described herein with reference to FIGS. 6-7.

Figure 2:
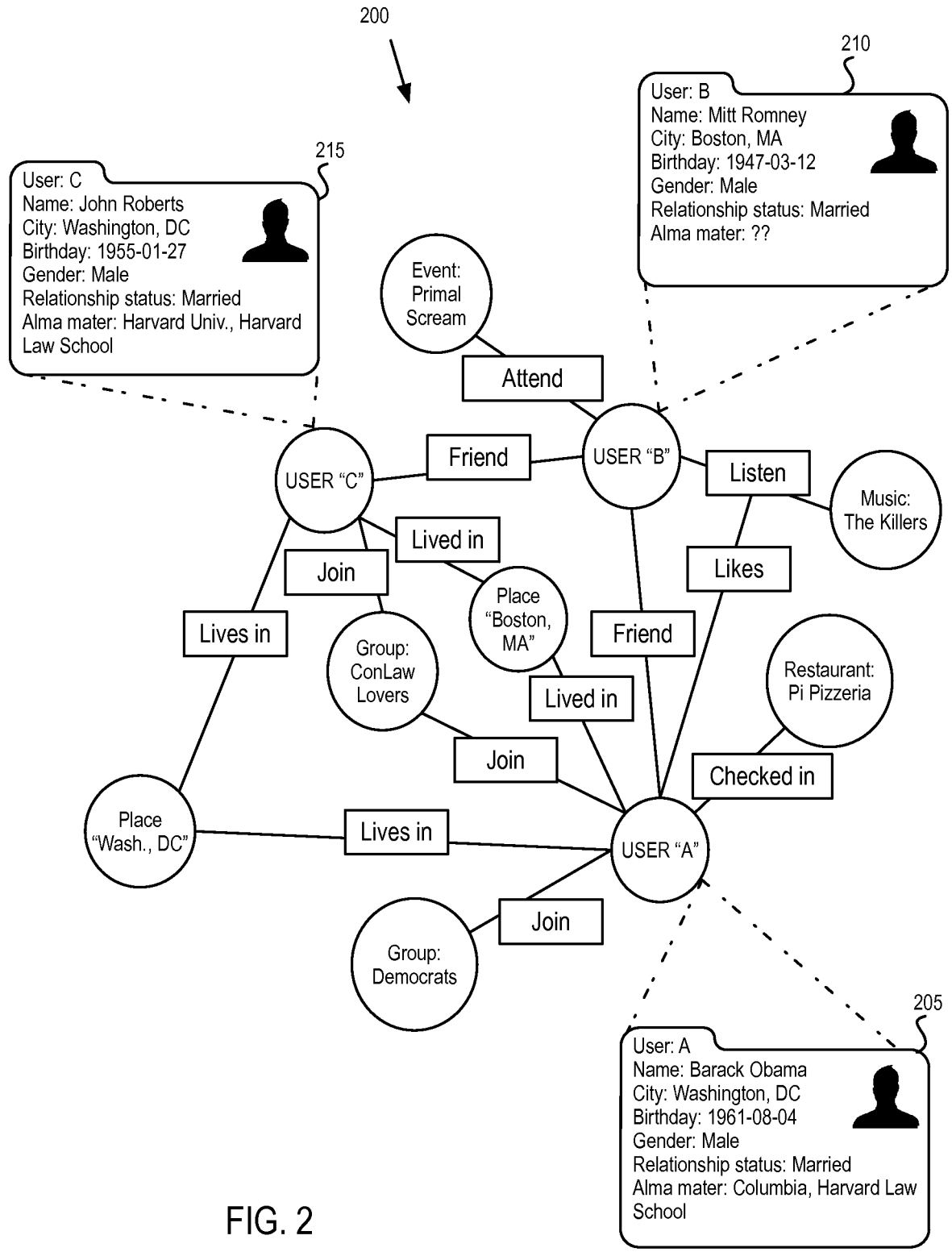
FIG. 2 illustrates an exemplary graph of social network data used to trigger a promotion, filter a promotion, or provide social context for a promotion.

FIG. 2 illustrates exemplary graph 200 of social network data used to trigger a promotion, filter a promotion, or provide social context for a promotion. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, the promotion module 129 utilizes user characteristics stored in the graph 200 to resolve triggers, filters, social context, and/or dynamic content for a promotion. In one embodiment, users may select privacy settings to control what network service data is shared, with whom the data is shared, and/or what data used for selecting candidate objects.

Figure 3:
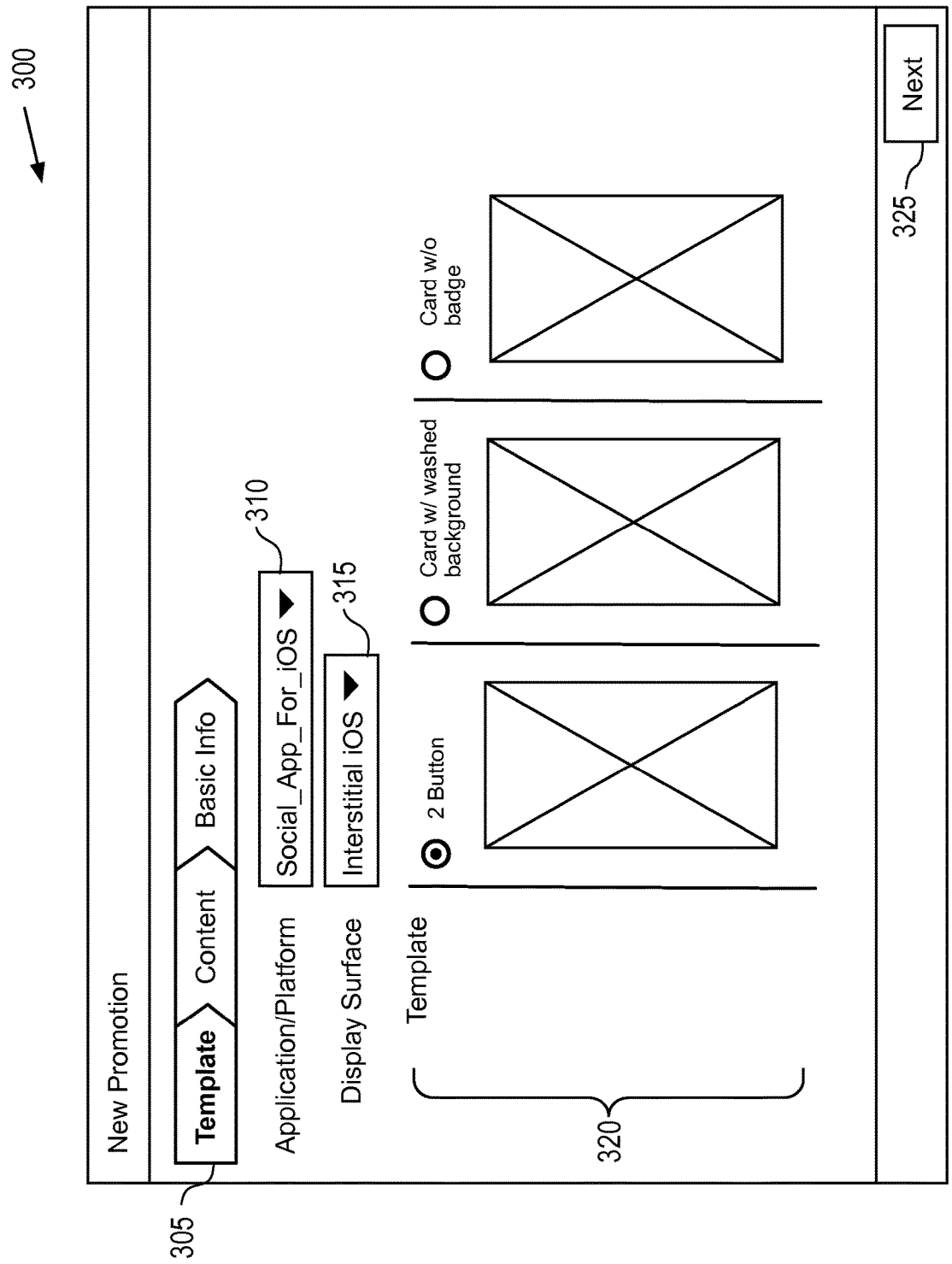
FIGS. 3-5 illustrate an exemplary user interface for the creation of promotion.
Figure 4A:
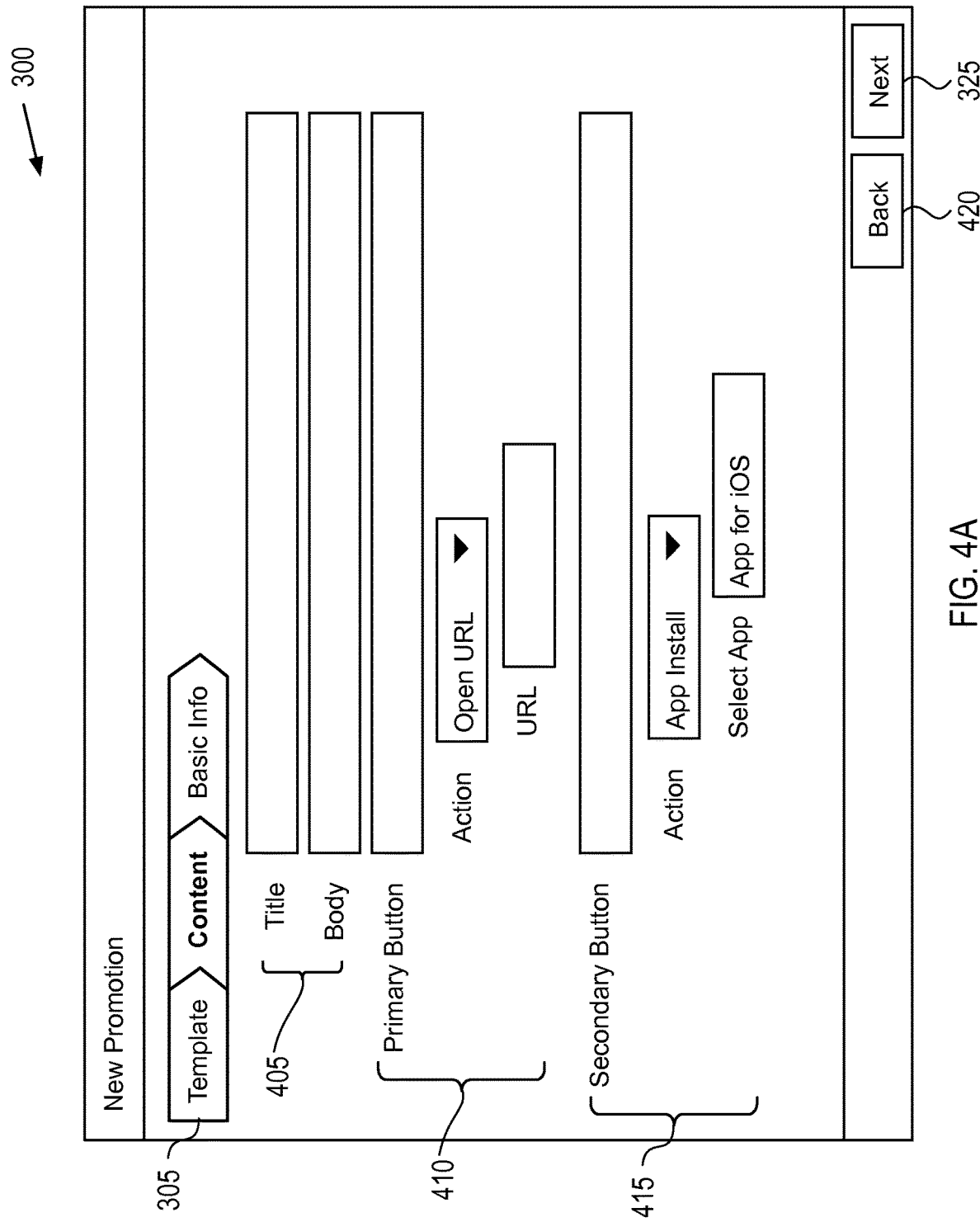
Figure 4B:
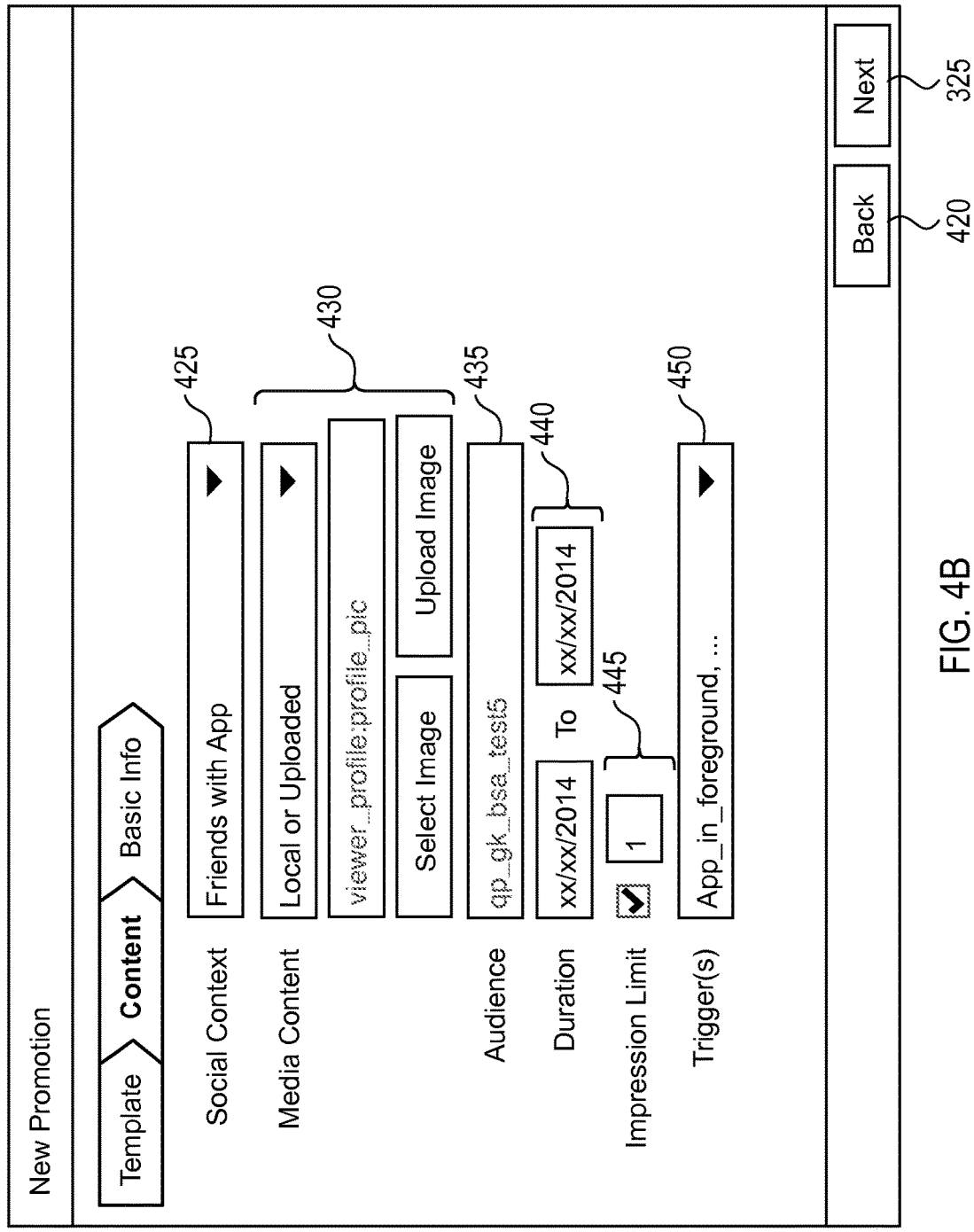
Figure 5:
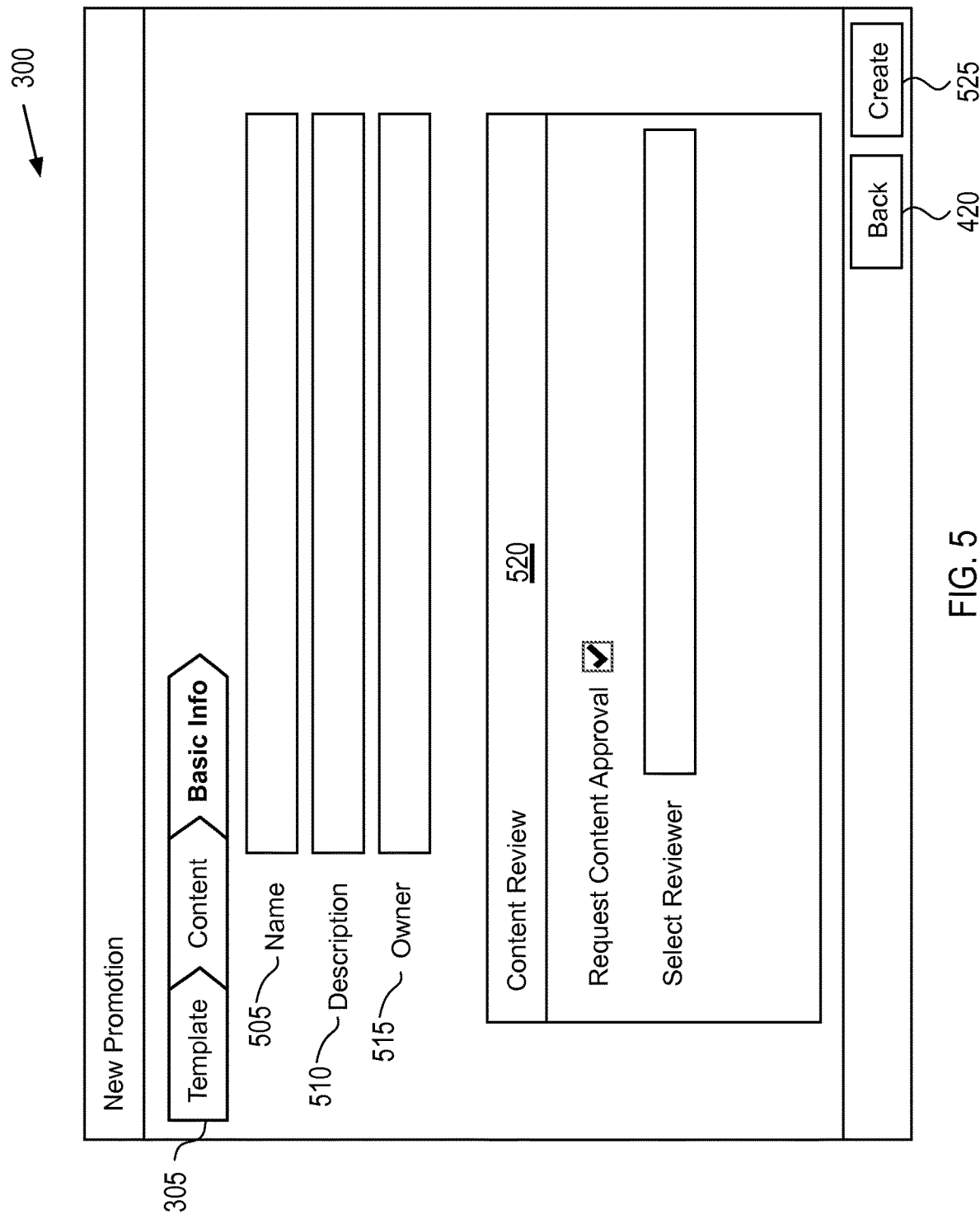

FIGS. 3-5 illustrate exemplary user interface 300 for the creation of promotion according to an embodiment. User interface 300 includes promotion menu 305. Promotion menu 305 indicates the different portions of the process of creating a new promotion, including the selection of a template, the configuration of the content, and the addition of other basic information. As illustrated through the use of bold text in promotion menu 305, FIG. 3 is an example of template portion of the promotion creation process.

User interface 300 includes multiple drop-down menus, selectable elements, and other user interface elements to enable the selection and configuration of different aspects of a promotion, including application/platform menu 310, display surface menu 315, and template selector 320. Application/platform menu 310 enables the creator of the promotion to select the application and/or platform upon which the promotion will be run. For example, application/platform menu 310 may include multiple applications, each of which delivers content to a user and is able to display a promotion. These applications may include social networking applications, photo sharing applications, messenger applications, games, mobile device utilities, etc. Each application may be further identified by a platform upon which it runs. For example, a social networking application implemented on one operating system may be differentiated from the social networking application when implemented on another operating system. As illustrated, application/platform menu 310 is currently set to the selection of a social networking application for iOS®. In one embodiment, selection of an application applies the promotion to the application across multiple platforms.

Display surface menu 315 enables the creator of the promotion to select where within the display surface of the selected application the promotion will be displayed. For example, a promotion may be displayed inline with a feed of posts from connections of a user, in a designated portion of the display surface, as occupying the entire display surface, as a pop-window or card, etc.

Template selector 320 enables the creator of the promotion to select the appearance of the promotion and/or default customizable content. For example, templates may include a default layout of text content, image/video content, buttons, social context, etc. In one embodiment, template selector 320 further includes a description of the elements included within, required by, and/or optional within each template.

Next button 325 enables the creator of the promotion to continue to the next portion of the process of creating a new promotion. For example, selection of next button 325 results in user interface 300 displaying the contents portion of the process of creating a new promotion. In an alternate embodiment, the next portion of the process of creating a new promotion is reached via scrolling within user interface 300.

As illustrated through the use of bold text in promotion menu 305, FIGS. 4A-C provide an example of content portion of the promotion creation process. In FIG. 4A, user interface 300 includes elements to add text content and configure buttons within a promotion. For example, the creator of a promotion may enter a title and/or body of text for text content 405. Additionally, text content may be entered to label primary button 410 or secondary button 415. In configuring buttons, the promotion creator may select and configure actions performed by each button. For example, primary button 410 is configured to open a network address and includes an input area for entering the network address. Similarly, secondary button 415 is configured to install an application and includes an input area for entering the application to be installed upon user selection of the secondary button. Additional exemplary button actions include closing the promotion, continuing the display of promotion to show additional content, to share or otherwise post content to a social network, etc.

Back button 420 enables the creator of the promotion to return to the previous portion of the process of creating a new promotion. For example, selection of back button 420 results in user interface 300 displaying the template portion of the process of creating a new promotion.

In FIG. 4B, user interface 300 includes elements to add social context 425, media content 430, target audience 435, duration 440, impression limit 445, and promotion trigger(s) 450. Social context menu 425 enables the promotion creator to add social context relevant to the individual viewer of the promotion. For example, a promotion creator may select to provide social context including the promotion viewer's social networking friends/connections that have acted on, interacted with, or are otherwise connected to the promotion. In an embodiment in which the promotion encourages users to download another application, social context 425 may cause the promotion to include an indication of social networking connections of the promotion viewer that have downloaded the promoted application. Other exemplary social context includes all users of a service (e.g., of a social networking system), users within a particular demographic group, defined subsets of social networking connections, etc. As described above, social networking connections (and degrees of connectedness) may be determined using social graph 200.

Media content 430 enables the promotion creator to add one or more images or videos. The media content may be selected or uploaded locally or remotely (e.g., from the promotion creator's computer or from remote storage), dynamically resolved (e.g., a profile picture of the user viewing the promotion), etc.

Audience 435 enables the promotion creator to select a group of users of the network service to be targeted for the promotion. For example, the promotion creator may wish to transmit the promotion to all users of the network service, users meeting one or more demographic characteristics, users that have taken a particular action within the network service, etc. In one embodiment, the group of users is configured via reference to a name of a list of users, a group of users as defined by a characteristic or relation to the user to view the promotion, or other indicator of the group.

Duration 440 enables the promotion creator to configure the start and/or stop of the promotion. In one embodiment, duration 440 is configured in terms of days. Alternatively, or additionally, duration 440 is configured in terms of hours, minutes, seconds, or another measure of time.

Impression limit 445 provides the promotion creator with the option of limiting the number of times the promotion is presented to a given user. For example, as illustrated, the impression limit is active (e.g., via a checkbox) and set to a limit of one impression. As a result, the promotion will be shown to a user defined by audience 435 one time, but no more after that first impression.

Trigger(s) 450 enables the promotion creator to define one or more triggers that will cause the display of the promotion. For example, as illustrated, trigger(s) 450 include the selected trigger of having or bringing the selected in application into the foreground. Other exemplary triggers include user selection of a feature or functionality within an application, the start of a new session within the application, selection of a tab to view a different portion of an application, the start/end of a call/conversation with another user, another action performed by the user within the network service, an action performed by a connection of the user within the network service, etc. In one embodiment, multiple triggers are selected from drop-down trigger menu 450 or another display of trigger options. In one embodiment, the promotion creator elects whether to apply a combination of multiple triggers via a Boolean operator or similar indicator. For example, two triggers may each define a condition to trigger the promotion. Configuration of the two triggers may include requiring that both trigger conditions need to be satisfied to trigger the promotion, either trigger condition can be satisfied to trigger the promotion, or only one (but not both) trigger condition needs to be satisfied to trigger the promotion.

In FIG. 4C, user interface 300 includes exemplary filters to refine the audience of users to which the promotion is transmitted. For example, the filters may include server-side filters (e.g., conditions determined by the server without requesting information or filter resolution from the user device) and client-side filters (e.g., user device state conditions provided by or resolved by the user device). Sever-side and client side filters are described further herein with reference to FIGS. 6-7. In one embodiment, the promotion creator elects whether to apply a combination of multiple filters via a Boolean operator or similar indicator. For example, two filters may each define a condition to be met before displaying the promotion. Configuration of the two filters may include requiring that both filter conditions need to be satisfied to display the promotion, either filter condition can be satisfied to display the promotion, only one (but not both) filter condition needs to be satisfied to display the promotion, etc. Exemplary filters include requiring that the user device be running an application version less than or equal to a selected application version number 455, the user device be running an application version greater than or equal to a selected application version number 460, the user device does not have a selected application installed 465, the user device has a selected application installed 470, the user device has a minimum amount of storage space available 475, the user device has a minimum battery level 480, that the current day is a particular day of the week 485, that the user device has been active for a threshold amount of time in a given session 490, that the user device is on a non-metered network connection 495 (e.g., a Wifi connection may provide unlimited data downloads to the user device while downloading data via a cellular network connection a data download limit or otherwise incur a metered cost per unit of data downloaded), etc.

As illustrated through the use of bold text in promotion menu 305, FIG. 5 is an example of the basic information portion of the promotion creation process. For example, the promotion creator may enter a name for the promotion 505, a description of the promotion 510, and an owner for the promotion 515. As a result, the promotion can be indexed and retrieved from storage (e.g., in promotion store 144) by name 505. Additionally, the promotion can be differentiated from other promotions or quickly understand by reference to description 510 and/or owner 515.

In one embodiment, the promotion creator utilizes content review 520 to submit the promotion for review prior to initiating the promotion or the transmission of promotion to users of the network service. For example, a checkbox or other element may be used to request approval of content. Additionally, an input box or drop-down menu may enable selection of a particular reviewer.

Create button 525 enables the creator of the promotion to initiate the promotion or submit the promotion for review prior to initiation. For example, selection of create button 525 results in the beginning of the duration of a promotion or the network service initiating the promotion at an indicated start time.

Figure 6:
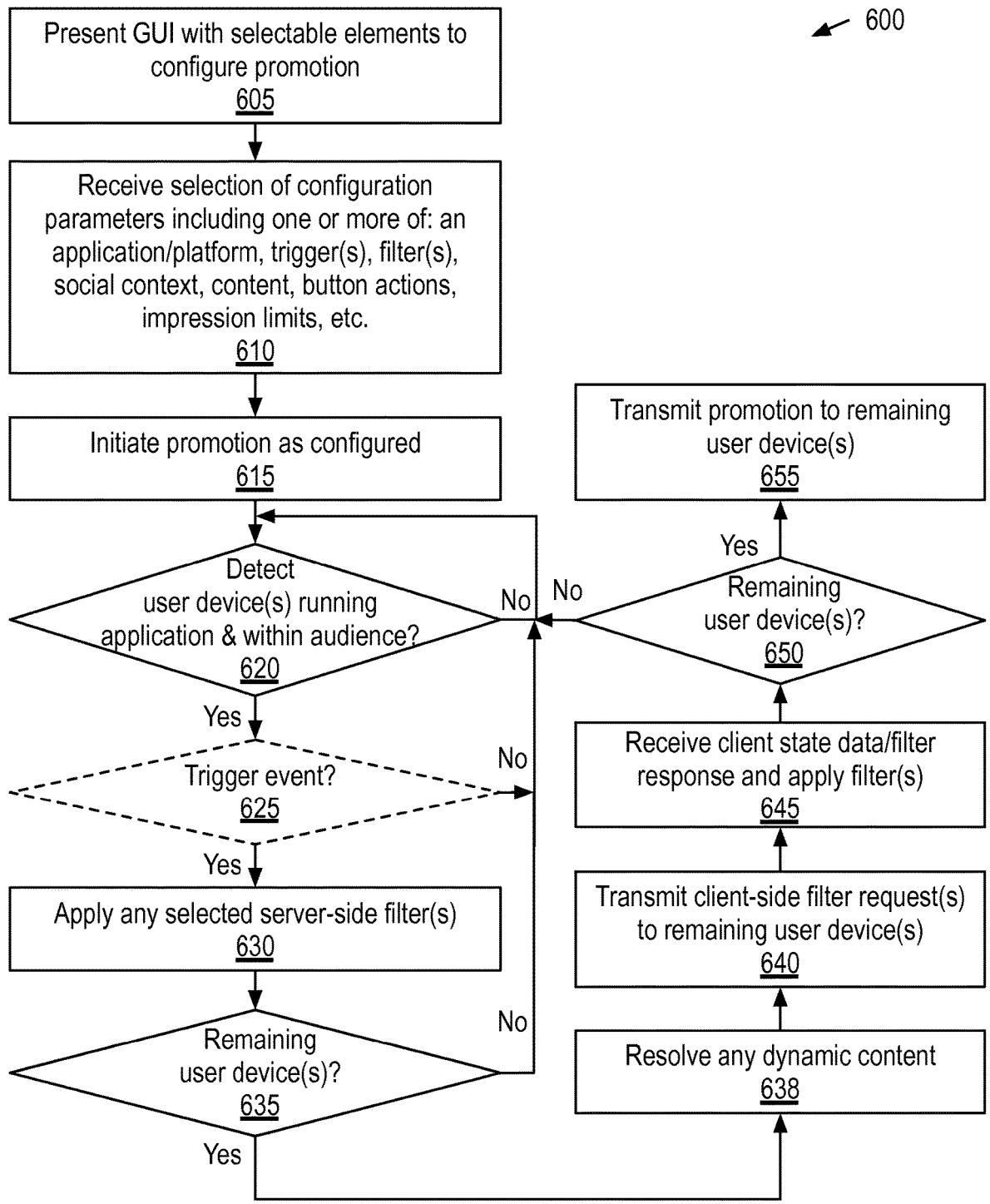
FIG. 6 illustrates an exemplary method of a networking service creating and running a promotion.

FIG. 6 illustrates method 600 of a networking service creating and running a promotion according to an embodiment. At block 605, promotion module 129 presents, to a promotion creator, a GUI including selectable elements to enable the configuration of a promotion. For example, promotion module 129 transmits user interface 300 to the promotion creator.

At block 610, promotion module 129 receives selection of configuration parameters within the GUI. The selected configuration parameters include one or more of: an application/platform, trigger(s), filter(s), social context, content, button actions, impression limits, etc., as described above. In one embodiment, promotion module 129 receives selection of the application/platform upon which the promotion will be displayed and one or more filters for determining which users within a selected audience will receive the promotion.

At block 615, promotion module 129 initiates the promotion as configured. For example, promotion module 129 initiates the promotion in response to receiving selection of create button 525 and/or detecting the current time coincides with a configured start time as described above.

At block 620, promotion module 129 determines if a user device associated with a user account in the promotion's selected audience is running the selected application/platform as defined in the promotion configuration. For example, referring to FIGS. 3 and 4B, promotion module 129 may detect whether or not a user device accessing a network service is associated with a user account within audience defined by "gp_gk_bsa_test5" and running application/platform "Social_App_For_iOS." If the user device does not these criteria, method 600 continues determining if other user devices may be detected that meet the criteria.

If one or more user devices are detected that are associated with the selected audience and running the selected application/platform, at block 625, promotion module 129 optionally determines if a trigger event has occurred for each detected user device. For example, promotion module 129 may determine that the detected user device has brought the selected application into the foreground (as defined by trigger configuration 450) based upon a request from or data transmitted to social networking system 130. If a trigger event has not occurred, method 600 returns to block 620 to continue detecting user devices and monitoring for trigger events. Alternatively, promotion module 129 sends one or more trigger events to the user device as associated data along with the promotion. For example, the user device receives the trigger events, determines if the trigger event(s) occur, and displays the promotion upon detecting the occurrence of the trigger event(s).

If a trigger event has occurred, or if no triggers are configured, method 600 continues to block 630 and applies server-side filters (if any, e.g., as configured at block 610). For example, promotion module 129 may determine, without requesting data from the user device and without requesting the user device to resolve the filter, the resolution for a filter that conditions delivery of the promotion based upon the day of the week, a user account setting stored within social networking system 130, an amount of time that has passed following a received user action, an amount of time that has passed in the current networking service session with the user device, if an impression limit has been reached by the user device/account, etc. Promotion module 129 removes any detected user devices as candidates to receive the promotion if the server-side filter condition(s) are not met for those user devices.

At block 635, promotion module 129 determines if any detected user devices remain after applying the server-side filter(s). If all of the detected user devices were filtered out, method 600 returns to block 620 to continue detecting user devices, monitoring for trigger events, and applying server-side filters.

If one or more detected user devices remain after applying the server-side filter(s), at 638, promotion module 129 resolves any dynamic content within the promotion. For example, the promotion creator may have configured the promotion to include dynamically resolved text and/or images, such as the user's name, the user's profile picture, social context for the user, etc. In one embodiment, the dynamic content includes a dynamically resolved link (e.g., a uniform resource locator (URL), web address, etc.) for an action taken in response to user selection of a button. For example, a dynamically resolved link may be used to generate a specific tracking parameter appended to the link. In one embodiment, if the dynamic content cannot be resolved, promotion module 129 filters out the promotion for the user device. For example, the content may not be resolved due to the content not applying to a particular user. In another embodiment, promotion module 129 sends one or more unresolved content items to the user device as associated data along with the promotion and the user device dynamically resolves the content or filters out the promotion accordingly.

At block 640, promotion module 129 transmits one or more client-side filter requests to the remaining user device(s). For example, promotion module 129 may transmit a request to a remaining user device for the user device to provide device state data or to evaluate device state data against a threshold or other filter requirement. Referring to FIG. 4C, if a promotion creator selected minimum threshold battery level 480 to be 20%, promotion module 129 either transmits the filter to the user device to determine if the user device's current battery level is at or above 20% or transmits a request to the user device for the user device's current battery level.

At block 645, promotion module 129 receives the user device response(s) to the client-side filter request(s). Promotion module 129 uses the received response(s) to apply the client-side filters. Continuing with the example above, if a user device responded to the request for current battery level with a level of 15% (or another indication that the user device is below the threshold), promotion module 129 would filter out the user device from the one or more candidates to receive the promotion. For example, users operating devices with a low battery level that may not be as receptive to a promotion, so such users are filtered out. Similarly, the client-side filter may define a minimum threshold for available storage space on the user device. As a result, user devices that do not have the threshold level of storage space are filtered out of a promotion that, e.g., may urge the user to download an application or other data that requires that threshold amount of storage space.

At block 650, promotion module 129 determines if any detected user devices remain after applying the client-side filter(s). If all of the detected user devices were filtered out, method 600 returns to block 620 to continue detecting user devices, monitoring for trigger events, and applying filters.

At block 655, promotion module 129 transmits the promotion to the remaining user device(s). For example, promotion module 129 causes the promotion to be displayed on the user device in the configured display surface 315 and template format 320 with the static and/or dynamically resolved content 405-415, 425, and/or 430.

Figure 7:
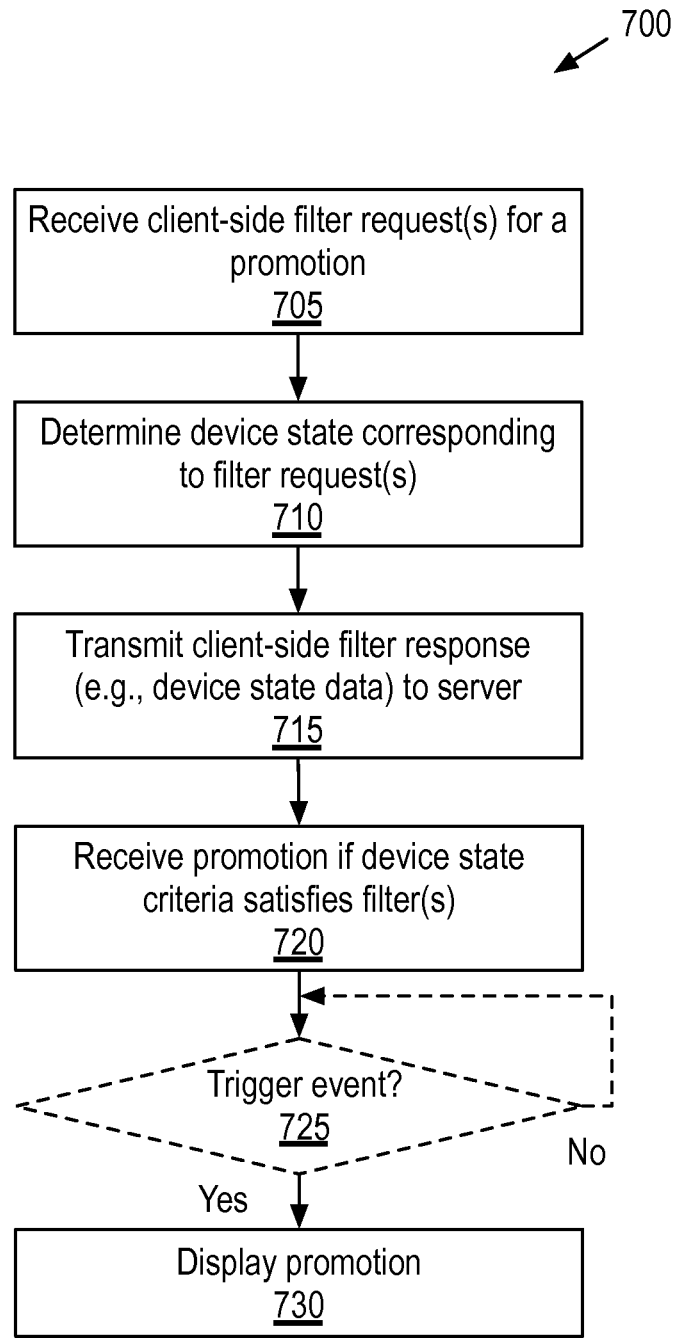
FIG. 7 illustrates an exemplary method of a user device receiving and responding to a client-side filter request.

FIG. 7 illustrates method 700 of a user device receiving and responding to a client-side filter request according to an embodiment. At block 705, user device 104 receives a client-side filter request from promotion module 129. In one embodiment, the request is for the user device to provide device state data. In another embodiment, the request is for the user device to determine if the device state meets criteria defined by the filter.

At block 710, user device 104 determines the device state corresponding to the filter request(s). Continuing with the example above, if the user device receives a request for current battery level, the user device determines its current battery level. Alternatively, if the user device receives a request to determine if the device's current battery level is at or above a threshold, the user device compares the device's current battery level to the threshold.

At bock 715, user device 104 transmits a filter response to promotion module 129. Continuing with the example above, the user device transmits the determined current battery level or an indication whether or not the current battery level is at or above the threshold defined by the filter.

At block 720, user device 104 receives the promotion from promotion module 129 if user device 104 satisfied the criteria defined by the client-side filter(s) as describe with reference to FIG. 6.

At block 725, user device 104 optionally determines if a trigger event has occurred or otherwise monitors for a trigger event. For example, user device 104 receives one or more trigger events as associated data along with the promotion and displays the promotion upon detecting the occurrence of the trigger event(s) at block 730. Alternatively, at block 730, user device 104 displays the promotion without monitoring for a trigger event.

In one embodiment, user device 104 receives a flag associated with the promotion indicating that the promotion should not be shown. Instead of displaying the promotion, the flag indicates that user device 104 should evaluate and log the promotion as though shown if eligible for display (based upon filters, dynamically resolved content, etc.), for the purposes of experimentation and reporting back to promotion module 129.

Figure 8:
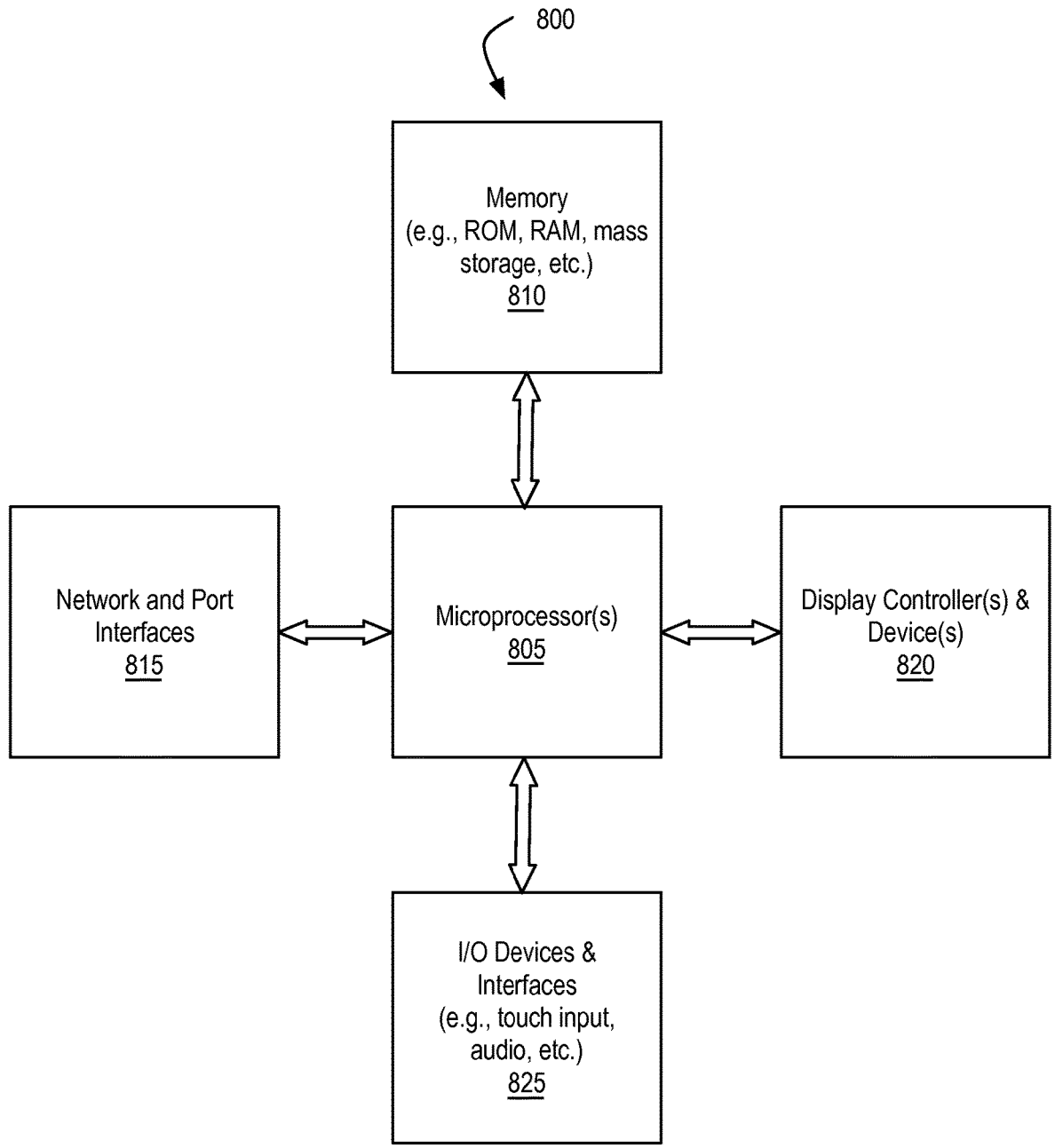
FIG. 8 illustrates, in block diagram form, an exemplary processing system to create and run a promotion.

FIG. 8 illustrates, in block diagram form, an exemplary processing system 800 to create and run a promotion. Data processing system 800 is an exemplary representation of one or more of the user devices 104, external server 115, social networking system 130, or components thereof described above.

Data processing system 800 includes one or more microprocessors 805 and connected system components (e.g., multiple connected chips). Alternatively, data processing system 800 is a system on a chip.

Data processing system 800 includes memory 810, which is coupled to microprocessor(s) 805. Memory 810 may be used for storing data, metadata, and programs for execution by the microprocessor(s) 805. For example, memory 810 may include one or more of the data stores 101 and/or may store modules described herein. Memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 810 may be internal or distributed memory.

Data processing system 800 includes network and port interfaces 815, such as a port, connector for a dock, or a connector for a USB interface, FireWire, Thunderbolt, Ethernet, Fibre Channel, etc. to connect the system 800 with another device, external component, or a network. Exemplary network and port interfaces 815 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 800 with another device, external component, or a network and receive stored instructions, data, tokens, etc.

Data processing system 800 also includes display controller and display device 820 and one or more input or output ("I/O") devices and interfaces 825. Display controller and display device 820 provides a visual user interface for the user. I/O devices 825 allow a user to provide input to, receive output from, and otherwise transfer data to and from the system. I/O devices 825 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 8.

Data processing system 800 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 800 may be a network computer, server, or an embedded processing device within another device or consumer electronic product. As used herein, the terms computer, device, system, processing system, processing device, and "apparatus comprising a processing device" may be used interchangeably with data processing system 800 and include the above-listed exemplary embodiments.

Additional components, not shown, may also be part of data processing system 800, and, in certain embodiments, fewer components than that shown in FIG. 8 may also be used in data processing system 800. It will be apparent from this description that aspects of the inventions may be embodied, at least in part, in software. That is, the computer-implemented methods 600 and 700 may be carried out in a computer system or other data processing system 800 in response to its processor or processing system 805 executing sequences of instructions contained in a memory, such as memory 810 or other non-transitory machine-readable storage medium. The software may further be transmitted or received over a network (not shown) via network interface device 815. In various embodiments, hardwired circuitry may be used in combination with the software instructions to implement the present embodiments. Thus, the techniques are not limited to any specific combination of hardware circuitry and software, or to any particular source for the instructions executed by data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

As detailed herein, some embodiments of a method; embodiments of a non-transitory computer-readable medium storing instructions which, when executed by one or more processors in a processing device, cause the processing device to perform a method; and embodiments of an apparatus comprising a processing device, wherein the processing device executes instructions that cause the apparatus to perform a method include generating a graphical user interface including a plurality of selectable elements, the selectable elements defining configuration parameters of a promotion to be displayed to one or more users in a selected group of users of a network service, the selectable elements including a plurality of applications and a plurality of filters; receiving selection of an application within the graphical user interface; receiving selection of a first filter within the graphical user interface, wherein the selection of the application and the selection of the first filter configure the promotion to be displayed to a subset of the selected group of users, the subset being users that access the network service using a user device that both runs the selected application and meets user device state criteria defined by the selected first filter; detecting a user device that is running the selected application and is associated with the selected group of users; transmitting a request corresponding to the first filter to the user device; receiving a response corresponding to the first filter from the user device; determining the user device satisfies the user device state criteria defined by the first filter based upon the received response; and transmitting the promotion to the user device in response to determining the user device satisfies the user device state criteria defined by the first filter.

Additionally, some embodiments of the method further include one or more of: 1) receiving selection of a second filter within the graphical user interface; and receiving an input to apply a Boolean operator to the first and second filters, wherein the promotion is transmitted to the user device in response to determining the user device meets user device state criteria defined by an application of the Boolean operator to the first and second filters; 2) receiving selection of a second filter within the graphical user interface, wherein the promotion is transmitted to the detected user device in response to determining a user account associated with the detected user device includes activity that meets an activity threshold defined by the second filter; 3) the user device state criteria being defined by the selected first filter includes whether or not the user device has a threshold amount of available storage space; 4) the user device state criteria being defined by the selected first filter includes whether or not the user device is currently using a metered network connection; 5) the user device state criteria being defined by the selected first filter includes whether or not the user device has a threshold amount of remaining battery; 6) the user device state criteria being defined by the selected first filter includes whether or not the user device has another application installed; 7) receiving selection of a trigger within the graphical user interface, wherein the selected trigger defines a condition, when detected, causes the transmission of the promotion or an evaluation of the first filter; 8) the condition defined by the trigger including an action by a social network connection of a user account associated with the detected user device; and/or 9) receiving selection of a social context within the graphical user interface, wherein the selected social context results in the promotion including an indication of an association between content of the promotion and one or more social network connections of a user account associated with the detected user device.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   generating a graphical user interface including a plurality of selectable elements, the plurality of selectable elements defining configuration parameters of a promotion to be displayed to one or more users in a selected group of users of a communication system, the plurality of selectable elements including a plurality of applications, a plurality of client-side filters, and a plurality of server-side filters;

receiving a selection of an application within the graphical user interface;

receiving a selection of a server-side filter within the graphical user interface, the selected server-side filter indicating a server-side criteria comprising one or more of an amount of time has passed following a receipt of a user action, an amount of time has passed in a current networking service session, or an impression limit associated with the promotion has been met;

receiving a selection of a client-side filter of the plurality of client-side filters within the graphical user interface, wherein the client-side filter comprises a requirement of an active WIFI connection and a threshold amount of available storage space;

determining a first subset of the selected group of users, that access the communication system using a user device that both does not have the selected application installed and meets server side criteria of one or more of the amount of time having passed following a receipt of a user action, the amount of time having passed in a current networking service session, or the impression limit associated with the promotion has been met as defined by the selected server-side filter;

accessing a selection of one or more configuration parameters for the promotion within the graphical user interface, the one or more configuration parameters comprising a configuration parameter to indicate within the promotion actions of users connected to the user within the communication system;

recording interactions with the promotion by the users connected to the user within the communication system;

generating the promotion based on the selection of the one or more configuration parameters, wherein generating the promotion comprises including the recorded interactions with the promotion by the users connected to the user in the promotion;

transmitting a client-side request to the user devices of the first subset of the selected group of users that meet the server-side criteria seeking an indication of whether the user devices have an active WIFI connection and the threshold amount of available storage space;

receiving client state data from the user devices of the first subset of the selected group of users that indicates whether the user devices of the first subset have an active WIFI connection and the threshold amount of available storage space;

determining a second subset of the first subset of the selected group of users that have an active WIFI connection and the threshold amount of available storage space based on the received client state data; and transmitting the promotion for display on the user devices of the second subset of the first subset of the selected group of users in response to determining the user device meets user device state criteria as defined by the client-side filter.

2. The computer-implemented method of claim 1, further comprising:

accessing a selection of additional client-side filters within the graphical user interface;

receiving an input to apply a Boolean operator to the client-side filter and the additional client-side filters; and transmitting the promotion for display on select user devices of the second subset in response to determining the select user devices meet user device state criteria defined by an application of the Boolean operator to the client-side filter and the additional client-side filters.

3. The computer-implemented method of claim 2, wherein an additional client-side filter of the additional client-side filters comprises a requirement of an activity threshold.

4. The computer-implemented method of claim 2, further comprising determining that the first subset of the selected group of users meets the server-side criteria by analyzing user data within the communication system without requesting information from the user devices.

5. The computer-implemented method of claim 2, wherein an additional server-side filter of the server-side filters comprises a user account setting stored within the communication system.

6. The computer-implemented method of claim 2, wherein an additional client-side filter of the client-side filters comprises a requirement of a threshold amount of remaining battery.

7. The computer-implemented method of claim 2, wherein an additional client-side filter of the client-side filters comprises a requirement that the user device has another application installed.

8. The computer-implemented method of claim 1, further comprising:

receiving selection of a trigger within the graphical user interface, wherein the selected trigger defines a condition;

detecting the condition; and based on detecting the condition, determining the first subset of the selected group of users.

9. The computer-implemented method of claim 8, wherein the condition defined by the trigger includes an action by a communication system connection of a user account associated with the user device.

10. A non-transitory computer-readable medium storing instructions which, when executed by one or more processors in a processing device, cause the processing device to perform steps comprising:

generating a graphical user interface including a plurality of selectable elements, the plurality of selectable elements defining configuration parameters of a promotion to be displayed to one or more users in a selected group of users of a communication system, the plurality of selectable elements including a plurality of applications, a plurality of client-side filters, and a plurality of server-side filters;

receiving a selection of an application within the graphical user interface;

receiving a selection of a server-side filter within the graphical user interface, the selected server-side filter indicating a server-side criteria comprising one or more of an amount of time has passed following a receipt of a user action, an amount of time has passed in a current networking service session, or an impression limit associated with the promotion has been met;

receiving a selection of a client-side filter of the plurality of client-side filters within the graphical user interface, wherein the client-side filter comprises a requirement of an active WIFI connection and a threshold amount of available storage space;

determining a first subset of the selected group of users, that access the communication system using a user device that both does not have the selected application installed and meets server side criteria of one or more of the amount of time having passed following a receipt of a user action, the amount of time having passed in a current networking service session, or the impression limit associated with the promotion has been met as defined by the selected server-side filter;

accessing a selection of one or more configuration parameters for the promotion within the graphical user interface, the one or more configuration parameters comprising a configuration parameter to indicate within the promotion actions of users connected to the user within the communication system;

recording interactions with the promotion by the users connected to the user within the communication system;

generating the promotion based on the selection of the one or more configuration parameters, wherein generating the promotion compromises including the recorded interactions with the promotion by the users connected to the user in the promotion;

transmitting a client-side request to the user devices of the first subset of the selected group of users that meet the server-side criteria seeking an indication of whether the user devices have an active WIFI connection and the threshold amount of available storage space;

receiving client state data from the user devices of the first subset of the selected group of users that indicates whether the user devices of the first subset have an active WIFI connection and the threshold amount of available storage space;

determining a second subset of the first subset of the selected group of users that have an active WIFI connection and the threshold amount of available storage space based on the received client state data; and transmitting the promotion for display on the user devices of the second subset of the first subset of the selected group of users in response to determining the user device meets user device state criteria as defined by the client-side filter.

11. The non-transitory computer-readable medium of claim 10, the steps further comprising:

accessing a selection of additional client-side filters within the graphical user interface;

receiving an input to apply a Boolean operator to the client-side filter and the additional client-side filters; and transmitting the promotion for display on select user devices of the second subset, in response to determining the select user devices meet user device state criteria defined by an application of the Boolean operator to the client-side filter and the additional client-side filters.

12. The non-transitory computer-readable medium of claim 11, wherein an additional client-side filter of the additional client-side filters comprises a requirement of an activity threshold.

13. The non-transitory computer-readable medium of claim 11, further comprising instructions that, when executed by the one or more processors, causes the processing device to determine that the first subset of the selected group of users meets the server-side criteria by analyzing user data within the communication system without requesting information from the user devices.

14. The non-transitory computer-readable medium of claim 11, wherein an additional server-side filter of the server-side filters comprises a user account setting stored within the communication system.

15. The non-transitory computer-readable medium of claim 11, wherein an additional client-side filter of the client-side filters comprises a requirement of a threshold amount of remaining battery.

16. The non-transitory computer-readable medium of claim 11, wherein an additional client-side filter of the client side filters comprises a requirement that the user device has another application installed.

17. The non-transitory computer-readable medium of claim 10, the steps further comprising:

receiving selection of a trigger within the graphical user interface, wherein the selected trigger defines a condition;

detecting the condition; and based on detecting the condition, determining the first subset of the selected group of users.

18. The non-transitory computer-readable medium of claim 17, wherein the condition defined by the trigger includes an action by a communication system connection of a user account associated with the user device.

19. A system comprising:

at least one processor; and a computer-readable storage medium storing instructions that, when executed by the at least one processor, cause the system to:

generate a graphical user interface including a plurality of selectable elements, the plurality of selectable elements defining configuration parameters of a promotion to be displayed to one or more users in a selected group of users of a communication system, the plurality of selectable elements including a plurality of applications, a plurality of client-side filters, and a plurality of server-side filters;

receive a selection of an application within the graphical user interface;

receive a selection of a server-side filter within the graphical user interface, the selected server-side filter indicating a server-side criteria comprising one or more of an amount of time has passed following a receipt of a user action, an amount of time has passed in a current networking service session, or an impression limit associated with the promotion has been met;

receive a selection of a client-side filter of the plurality of client-side filters within the graphical user interface, wherein the client-side filter comprises a requirement of an active WIFI connection and a threshold amount of available storage space;

determine a first subset of the selected group of users, that access the communication system using a user device that both does not have the selected application installed and meets server-side criteria of one or more of the amount of time having passed following a receipt of a user action, the amount of time having passed in a current networking service session, or the impression limit associated with the promotion has been met as defined by the selected server-side filter;

access a selection of one or more configuration parameters for the promotion within the graphical user interface, the one or more configuration parameters comprising a configuration parameter to indicate within the promotion actions of users connected to the user within the communication system;

record interactions with the promotion by the users connected to the user within the communication system;
generate the promotion based on the selection of the one or more configuration parameters, wherein generating the promotion compromises including the recorded interactions with the promotion by the users connected to the user in the promotion;
transmit a client-side request to the user devices of the first subset of the selected group of users that meet the server-side criteria seeking an indication of whether the user devices have an active WIFI connection and a threshold amount of available storage space;
receive client state data from the user devices of the first subset of the selected group of users that indicates whether the user devices of the first subset have an active WIFI connection and the threshold amount of available storage space;
determine a second subset of the first subset of the selected group of users that have an active WIFI connection and the threshold amount of available storage space based on the received client state data; and
transmit the promotion for display on the user devices of the second subset of the first subset of the selected group of users in response to determining the user device meets user device state criteria as defined by the client-side filter.

20. The system as recited in claim 19, further comprising instructions that, when executed by the at least one processor, cause the system to:

access a selection of additional client-side filters within the graphical user interface;

receive an input to apply a Boolean operator to the client-side filter and the additional client-side filters; and transmit the promotion for display on select user devices of the second subset, in response to determining the select user devices meet user device state criteria defined by an application of the Boolean operator to the client-side filter and the additional client-side filters.

* * * * *